United States Patent
Uhlman et al.

(10) Patent No.: US 10,816,019 B2
(45) Date of Patent: Oct. 27, 2020

(54) HYDRAULIC FLUID WARMING SYSTEM AND METHOD

(71) Applicant: THE BOEING COMPANY, Chicago, IL (US)

(72) Inventors: Matthew D. Uhlman, Kirkland, WA (US); Barry D. Hance, Woodinville, WA (US); Herbert Guttler, Mukilteo, WA (US); Robert J. Hawk, Seattle, WA (US); Paul Smith, Seattle, WA (US); Patrick Fahey, Snohomish, WA (US); Ellen A. Pifer, Seattle, WA (US); Christopher P. Beamis, Mukilteo, WA (US); Ali Abdelmagid, Bellevue, WA (US); Patrick McCormick, Mukilteo, WA (US); Mark W. Lesyna, Everett, WA (US)

(73) Assignee: THE BOEING COMPANY, Chicago, IL (US)

(*) Notice: Subject to any disclaimer, the term of this patent is extended or adjusted under 35 U.S.C. 154(b) by 300 days.

(21) Appl. No.: 15/969,413

(22) Filed: May 2, 2018

(65) Prior Publication Data
US 2019/0338793 A1   Nov. 7, 2019

(51) Int. Cl.
| | |
|---|---|
| F15B 21/04 | (2019.01) |
| F15B 21/042 | (2019.01) |
| B64C 13/40 | (2006.01) |
| F15B 11/08 | (2006.01) |
| F15B 20/00 | (2006.01) |

(52) U.S. Cl.
CPC ............ *F15B 21/042* (2013.01); *B64C 13/40* (2013.01); *F15B 11/08* (2013.01); *F15B 20/005* (2013.01)

(58) Field of Classification Search
CPC .. F15B 21/042; F15B 20/005; F15B 21/0427; F15B 2211/50536; F15B 11/08; B64C 13/40
See application file for complete search history.

(56) References Cited

U.S. PATENT DOCUMENTS

| | | | |
|---|---|---|---|
| 4,704,865 A | 11/1987 | Archung | |
| 5,109,672 A | 5/1992 | Chenoweth et al. | |
| 5,535,711 A | 7/1996 | Kach | |
| 9,169,829 B2 * | 10/2015 | Nomaguchi | F03D 7/02 |
| 9,518,594 B1 | 12/2016 | Liao et al. | |
| 2010/0170238 A1 | 7/2010 | Behr et al. | |

* cited by examiner

*Primary Examiner* — Abiy Teka
(74) *Attorney, Agent, or Firm* — Moore IP Law

(57) ABSTRACT

A hydraulic system (e.g., of an aircraft or other vehicle) includes a pump, a pressure line coupled to the pump and configured to distribute pressurized hydraulic fluid, and a return line configured to return hydraulic fluid to a reservoir. The hydraulic system also includes an auxiliary leakage valve coupled to the pressure line, to the return line, and to an actuator. The auxiliary leakage valve is configured to receive a control signal and, based on the control signal, selectively open a restricted fluid path. The restricted fluid path couples the pressure line to the return line to allow a restricted amount of the hydraulic fluid to flow from the pressure line to the return line.

20 Claims, 6 Drawing Sheets

HYDRAULIC FLUID WARMING SYSTEM AND METHOD

FIELD OF THE DISCLOSURE

The present disclosure is related to warming hydraulic fluid of a hydraulic system.

BACKGROUND

A hydraulic system pressurizes hydraulic fluid and transfers the pressurized hydraulic fluid to various components. Hydraulic fluid is typically hydrocarbon based, and tends to be more viscous at lower temperatures. The hydraulic components tend to be less responsive during operation if the temperature of the hydraulic fluid is too low due to increased viscosity of the hydraulic fluid. For systems in which such temperature-based changes to the hydraulic system are unacceptable, such as for aircraft hydraulic systems, manual hydraulic warm-up procedures can be used to warm up the hydraulic fluid. For example, an aircrew or a ground crew can manipulate controls of an aircraft to actuate flight control surfaces of the aircraft to warm and circulate the hydraulic fluid. However, the hydraulic fluid begins to cool after the manual procedures are complete and the procedures must be restarted if the temperature falls below a threshold, and such manual procedures can increase operational costs because trained personnel are required to perform them.

SUMMARY

According to one implementation of the present disclosure, an aircraft includes a hydraulic system including hydraulic fluid, a pressure line, and a return line. The aircraft also includes a sensor configured to generate data related to a temperature of the hydraulic fluid of the hydraulic system and an actuator coupled to the hydraulic system. The aircraft further includes an auxiliary leakage valve coupled to the actuator, to the pressure line, and to the return line. The auxiliary leakage valve is configured to selectively open a restricted fluid path. The restricted fluid path couples the pressure line to the return line to allow a restricted amount of the hydraulic fluid to flow from the pressure line to the return line. The aircraft also includes a controller coupled to the auxiliary leakage valve and configured to, based on a comparison of a temperature value indicated by the data to a threshold, send a control signal to the auxiliary leakage valve or to the actuator to cause an increase in hydraulic fluid flow from the pressure line to the return line. According to one implementation, the auxiliary leakage valve includes a flow restrictor that is sized to allow enough warm hydraulic fluid to flow to the actuator and is sized to avoid compromising the actuator capability. That is, the actuator is operable whether the auxiliary leakage valve is open or closed. Thus, no failure of the auxiliary leakage valve (e.g., a fail open or a fail closed) risks limiting operation of the actuator.

According to another implementation of the present disclosure, a method includes receiving, at a controller, data related to a temperature of hydraulic fluid of a hydraulic system. The method also includes comparing a value indicated by the data to a threshold and, based on a result of comparing the value to the threshold, sending a control signal to a device coupled to the hydraulic system, the control signal causing the device to increase hydraulic fluid flow from a pressure line to a return line of the hydraulic system.

According to another implementation of the present disclosure, a hydraulic system includes a pump, a pressure line coupled to the pump and configured to distribute pressurized hydraulic fluid, and a return line configured to return hydraulic fluid to a reservoir. The hydraulic system also includes an auxiliary leakage valve coupled to the pressure line, to the return line, and to an actuator. The auxiliary leakage valve is configured to receive a control signal and, based on the control signal, selectively open a restricted fluid path. The restricted fluid path couples the pressure line to the return line to allow a restricted amount of the hydraulic fluid to flow from the pressure line to the return line.

One advantage of the above-described implementation is simplified and improved hydraulic fluid warming. For example, an auxiliary leakage valve of an aircraft hydraulic system opens different fluid paths based on control signals. If the temperature of the hydraulic fluid is below a temperature threshold, the auxiliary leakage valve opens a restricted fluid path to circulate some of the hydraulic fluid throughout the aircraft hydraulic system to warm the hydraulic fluid. If the temperature of the hydraulic fluid satisfies the temperature threshold, the auxiliary leakage valve closes. Additionally, the features, functions, and advantages that have been described can be achieved independently in various implementations or may be combined in yet other implementations, further details of which are disclosed with reference to the following description and drawings.

DETAILED DESCRIPTION

Figure 1:
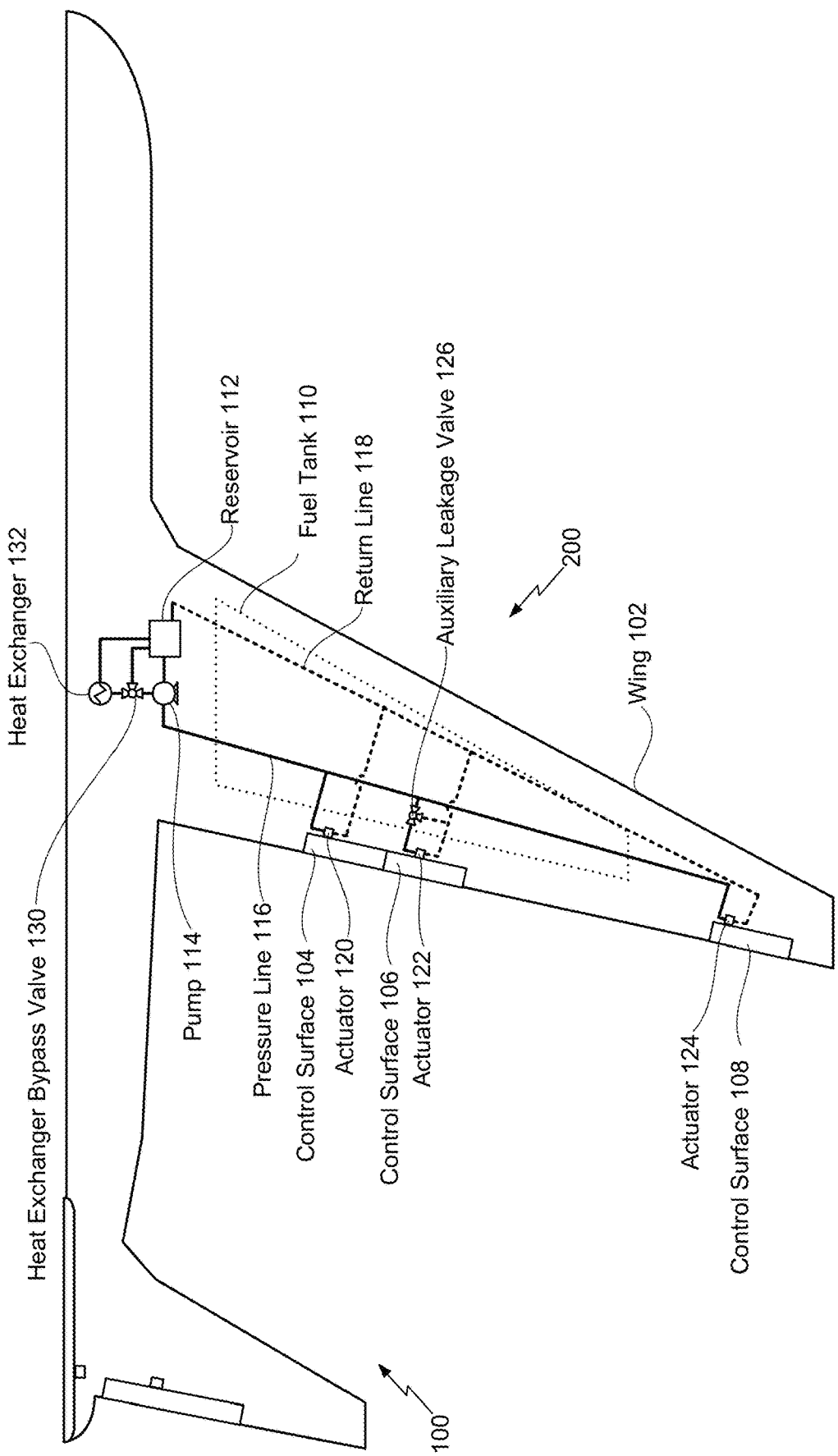
FIG. 1 is a diagram of an aircraft that includes a hydraulic system operable to control the flow of hydraulic fluid to warm the hydraulic fluid.

Particular embodiments of the present disclosure are described below with reference to the drawings. In the description, common features are designated by common reference numbers throughout the drawings.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

The techniques described herein enable automation of a hydraulic fluid warming operation by using an auxiliary leakage valve to control the flow of hydraulic fluid based on a temperature of the hydraulic fluid. The auxiliary leakage valve is coupled to an actuator such that hydraulic fluid provided to the actuator flows through the auxiliary leakage valve. The auxiliary leakage valve is configured to supply the actuator with a sufficient flow of hydraulic fluid for operation of the actuator whether the auxiliary leakage valve is in an open position or in a closed position. A valve position of the auxiliary leakage valve is selectable based on, among other factors, a temperature of the hydraulic fluid.

For example, a controller determines a temperature of the hydraulic fluid. If the temperature satisfies a temperature threshold (e.g., if the temperature is relatively warm), the auxiliary leakage valve remains closed, which enables the hydraulic fluid to flow to the actuator (e.g., a flight control actuator, a landing gear actuator, or another hydraulic actuator), but closes a flow restricted leakage fluid path (also referred to herein a "restricted fluid path"). In this example, because the temperature of the hydraulic fluid is relatively warm, the viscosity of the hydraulic fluid is relatively low, enabling efficient operation of the actuator and other components of the hydraulic system. However, if the temperature of the hydraulic fluid fails to satisfy the temperature threshold (e.g., if the temperature is relatively cool), the hydraulic fluid is more viscous than normal, which limits or reduces hydraulic fluid flow and can cause improper or inefficient operation of the actuator. In this circumstance, the controller generates a control signal and provides the control signal to the auxiliary leakage valve. In response to receiving the control signal, the auxiliary leakage valve opens the restricted fluid path, which enables a restricted amount of the hydraulic fluid to circulate in the hydraulic system. Circulating the hydraulic fluid in the hydraulic system warms the hydraulic fluid, which in turn enables warm hydraulic fluid to be distributed to various components coupled to the hydraulic system.

FIG. 1 is a diagram of a portion of an aircraft 100 that includes a hydraulic system 200 operable to control the flow of hydraulic fluid based on an aircraft characteristic. In particular, FIG. 1 shows one side of the aircraft 100 that includes a wing 102 and control surfaces 104, 106, and 108 coupled to the wing 102 that are powered by the hydraulic system 200. Although FIG. 1 illustrates only one wing and three control surfaces on the wing 102, in typical configurations, the aircraft 100 will include at least two wings, and other control surfaces (on the wings and elsewhere) coupled to the hydraulic system 200. Further, although each control surface in FIG. 1 is associated with a single actuator, in other implementations, one or more of the control surfaces are associated with multiple actuators.

Each control surface 104, 106, 108 in FIG. 1 is moveable using a corresponding actuator 120, 122, 124. For example, the control surface 104 is coupled to and moveable by an actuator 120, the control surface 106 is coupled to and moveable by an actuator 122, and the control surface 108 is coupled to and moveable by an actuator 124.

The hydraulic system 200 includes a reservoir 112 that stores hydraulic fluid, and a pump 114 coupled to the reservoir 112. The pump 114 is configured to pressurize the hydraulic fluid and provide the pressurized hydraulic fluid to the actuators 120-124 via pressure lines 116. The hydraulic fluid is returned to the reservoir 112 via return lines 118 coupled to the reservoir 112. In the example illustrated in FIG. 1, some of the pressure lines 116 and some of the return lines 118 pass through a fuel tank 110. The fuel tank 110 can hold a significant volume of fuel, which is not heated and as a result generally has a temperature similar to ambient temperature conditions. In this example, when the aircraft 100 is operating in a cold environment, the fuel can absorb a significant amount of heat from the hydraulic fluid. Thus, even if the hydraulic fluid in the reservoir 112 is warm, the hydraulic fluid in the pressure lines 116 and the return lines 118 can be much cooler.

In the example illustrated in FIG. 1, the pump 114 also includes a case drain coupled to a heat exchanger bypass valve 130. The case drain allows a portion of the hydraulic fluid to flow to the heat exchanger bypass valve 130. In the example illustrated in FIG. 1, the heat exchanger bypass valve 130 includes an inlet port and two outlet ports. A first outlet port of the heat exchanger bypass valve 130 is coupled to the reservoir 112 bypassing a heat exchanger 132, and a second port of the heat exchanger bypass valve 130 is coupled to the heat exchanger 132 before returning hydraulic fluid to the reservoir 112. Generally, the heat exchanger 132 is coupled to a cooling fluid source (not shown) to cool the hydraulic fluid. For example, in some operating conditions, the hydraulic fluid is warmed by environmental conditions, energy input by the pump 114, etc., which can heat the hydraulic fluid enough that the temperature of the hydraulic fluid exceeds an upper temperature threshold. In this example, the heat exchanger bypass valve 130 can route a portion or all of the hydraulic fluid in the case drain line (e.g., line 206 of FIG. 2) to the heat exchanger 132 to cool the hydraulic fluid. Conversely, when the temperature of the hydraulic fluid is below the upper temperature threshold, the valve 130 routes some of all of the hydraulic fluid in the case drain line back to the reservoir 112. In a particular implementation, the valve 130 is a mechanically controlled valve. For example, the valve 130 can be a thermostat valve that opens or closes a fluid path to the heat exchanger 132 based on heat of the hydraulic fluid causing a physical change (e.g., thermal expansion or a phase change) at the valve 130. In another particular implementation, the valve 130 is a computer-controlled valve that opens or closes the fluid path to the heat exchanger 132 responsive to a control signal from a controller (such as the controller 260 of FIG. 2).

In some implementations, the hydraulic fluid is heated primarily by energy (e.g., kinetic energy and waste heat) put into the hydraulic fluid by the pump 114. However, in other implementations, the hydraulic system can include heating elements to heat the hydraulic fluid. Alternatively or in addition, the heat exchanger 132 can be used to provide heat to the hydraulic fluid. In some implementations, thermoelectric heating or cooling of the hydraulic fluid can be used in addition to or instead of the heat exchanger 132.

In cold ambient conditions, cooling of the hydraulic fluid by the environment and the fuel in the fuel tank 110 can result in excessive viscosity of the hydraulic fluid at the actuators 120-124. One way to decrease the viscosity of the hydraulic fluid at the actuators 120-124 is to cycle the actuators 120-124. For example, a manual process, in which control inputs are provided to move the control surfaces, can be used. However, while cycling the actuators 120-124 will result in distribution of warm hydraulic fluid to the actuators 120-124, using this manual process requires the time and attention of a trained operator. Further, as soon as the operator stops cycling the actuators 120-124, the hydraulic fluid near those actuators 120-124 begins to cool. When the aircraft 100 is in operation (e.g., preparing for takeoff), the control surfaces 104, 106, 108 need to be ready (e.g., have access to hydraulic fluid with acceptable viscosity) and be in appropriate positions (e.g., in takeoff positions). Generally, for many of the control surfaces 104, 106, 108, this means the operator (e.g., the pilot) cannot be cycling the control surfaces 104, 106, 108, if preparations are being made for takeoff. Further, the pilot has other things to attend to during preparation for takeoff and requiring the pilot to prepare for takeoff, while also continuously cycling the actuators 120-124, would be unduly burdensome.

In the particular example illustrated in FIG. 1, the concerns above are avoided by use of the auxiliary leakage valve 126. The auxiliary leakage valve 126 is a computer controlled valve that includes an inlet port and two outlet ports. The inlet port is coupled to one of the pressure lines 116. A first outlet port is coupled to one of the actuators (e.g., the actuator 122 in FIG. 1), and a second outlet port is coupled to one of the return lines 118. In a particular implementation, the auxiliary leakage valve 126 provides hydraulic fluid to the first outlet port whether the auxiliary leakage valve 126 is open or closed, and provides hydraulic fluid to the second outlet port when the auxiliary leakage valve 126 is open. Thus, when the auxiliary leakage valve 126 is in a first position (e.g., "closed"), a restricted fluid path is closed and all hydraulic fluid from the pressure line 116 is provided (on demand) to the actuator 122. When the auxiliary leakage valve 126 is in a second position (e.g., "open"), a limited amount of hydraulic fluid from the pressure line 116 is recirculated back to the reservoir 112 via the return line 118 and all remaining hydraulic fluid from the pressure line 116 is provided (on demand) to the actuator 122. A controller 260 (shown in FIG. 2) controls the position of the auxiliary leakage valve 126 to enable circulation of hydraulic fluid throughout much, or all, of the hydraulic system 200 without actuation of the actuators 120-124.

In some implementations, the auxiliary leakage valve 126 can be used in conjunction with cycling some of the actuators to distribute warm hydraulic fluid. For example, in FIG. 1, the auxiliary leakage valve 126 is coupled to the actuator 122, and the actuator 122 controls the position of the control surface 106, which is not the furthest most actuator from the pump 114. Rather, the actuator 124 is further from the pump 114 than is the actuator 122. In this arrangement, placing the auxiliary leakage valve 126 in the second position distributes warm hydraulic fluid to most of the hydraulic system 200 while still allowing operation of the actuator 122. Additionally, the warm hydraulic fluid can be provided to the actuator 124 responsive to cycling the actuator 124. In some implementations, if the control surface 108 can be allowed to cycle (e.g., change positions very slightly, such as less than 10% of its full range of motion), the controller 260 or another controller can automatically cycle the actuator 124 slightly to distribute warm hydraulic fluid to the actuator 124. In such implementations, the warm hydraulic fluid is distributed to most of the hydraulic system 200 by use of the auxiliary leakage valve 126, so only a small amount of additional circulation is needed to distribute the warm hydraulic fluid to the actuator 124. Thus, the minor cycling of the control surface 108 is sufficient.

While FIG. 1 illustrates only a single auxiliary leakage valve 126, in other implementations, the hydraulic system 200 can include more than one auxiliary leakage valve 126. For example, the hydraulic system 200 can include one auxiliary leakage valve, such as the auxiliary leakage valve 126, for each actuator 120-124 (i.e., three auxiliary leakage valves in the example illustrated in FIG. 1). Alternatively, in some implementations, the pressure line 116 can be branched in multiple places, and an auxiliary leakage valve 126 can be coupled to one of more of the branches. Further, while the example illustrated in FIG. 1 only shows actuators 120-124, control surfaces 104-108, and the auxiliary leakage valve 126 along the wing 102, the aircraft 100 may include other actuators and control surfaces, any of which may be coupled to or associated with an auxiliary leakage valve, such as the auxiliary leakage valve 126, to enable computer controlled circulation of warm hydraulic fluid without cycling the respective actuators.

Figure 2:
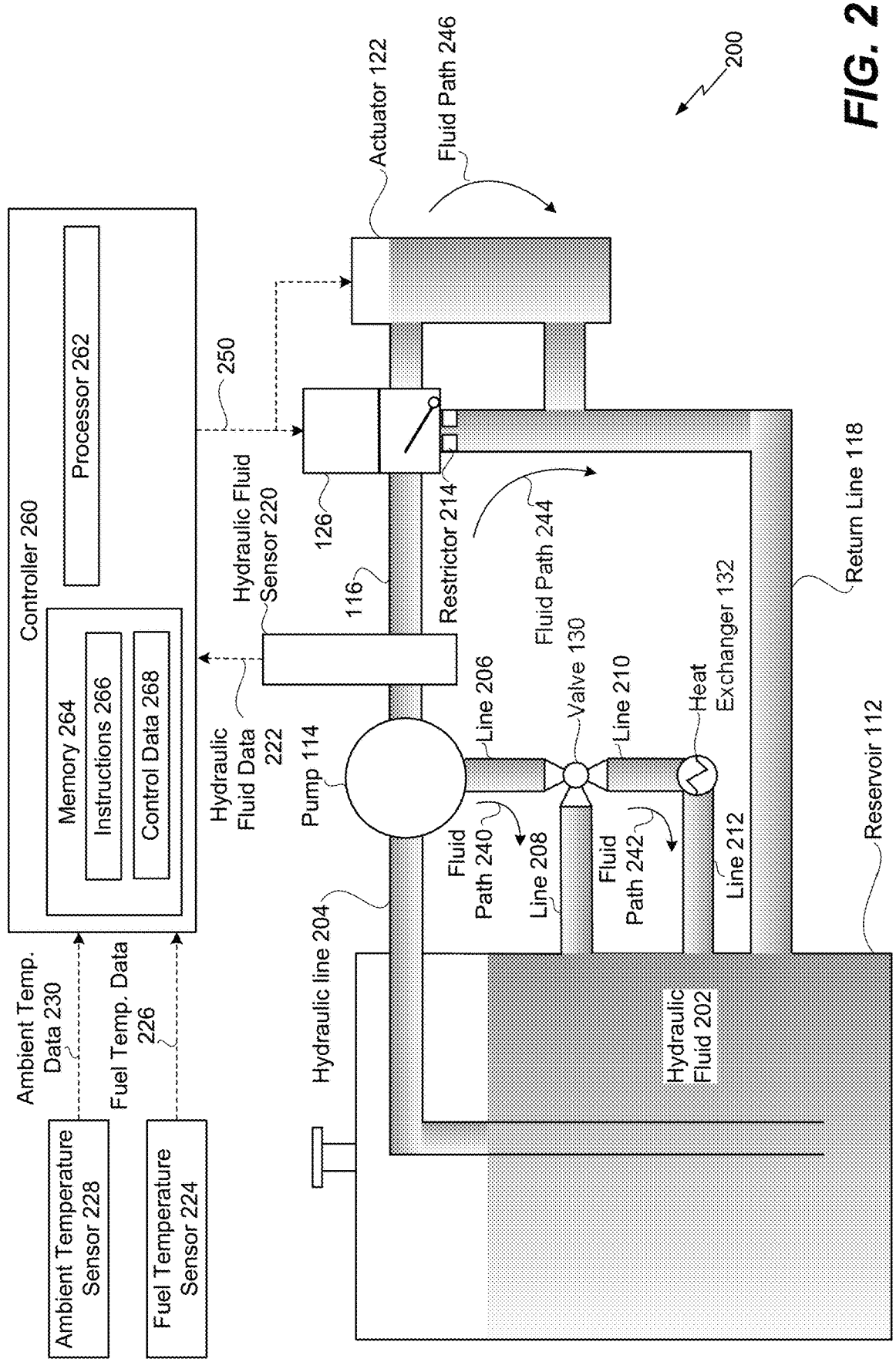
FIG. 2 is a diagram illustrating the hydraulic system of FIG. 1.

Referring to FIG. 2, a diagram of the hydraulic system 200 is shown. In FIG. 2, only a portion of the hydraulic system 200, including the reservoir 112, the pump 114, the auxiliary leakage valve 126, the actuator 122, and the heat exchanger bypass valve 130, is shown. Although the hydraulic system 200 is described, with reference to FIG. 1, as integrated within an aircraft, in other implementations, the hydraulic system 200 can be integrated into a structure (e.g., a bridge or oil platform) or into another vehicle. To illustrate, the hydraulic system 200 can be integrated into a car, a truck, a piece of construction equipment, a watercraft, etc.

In FIG. 2, the reservoir 112 is coupled to the pump 114 via a hydraulic line 204. The heat exchanger bypass valve 130 is coupled to a case drain of the pump 114 by a line 206, is coupled to the reservoir 112 via a line 208, and is coupled to the heat exchanger 132 via a line 210. The heat exchanger 132 is coupled to the reservoir 112 via a line 212. To increase the temperature of hydraulic fluid 202 throughout the hydraulic system, the pump 114 extracts the hydraulic fluid 202 from the reservoir 112 via the hydraulic line 204 and provides the hydraulic fluid 202 to the heat exchanger bypass valve 130 via the line 206.

As explained above, in a particular implementation, the heat exchanger bypass valve 130 allows hydraulic fluid 202 to flow to the heat exchanger 132 when the temperature of the hydraulic fluid 202 exceeds an upper temperature threshold. For example, the heat exchanger 132 cools the hydraulic fluid 202 and returns the hydraulic fluid 202 to the reservoir 112. In this implementation, the heat exchanger bypass valve 130 can be mechanically controlled (e.g., using a phase change or mechanical response to temperature). In some implementations, the heat exchanger 132 is further configured to heat the hydraulic fluid 202 when the temperature of the hydraulic fluid 202 is below a lower temperature threshold. In such implementations, the heat exchanger bypass valve 130 can be computer controlled (e.g., by the controller 260 or another controller) such that a fluid path to the heat exchanger 132 is open when the temperature of the hydraulic fluid 202 exceeds the upper temperature threshold and the heat exchanger 132 is configured to cool the hydraulic fluid 202, the fluid path to the heat exchanger 132 is closed when the temperature of the hydraulic fluid 202 is between the upper temperature threshold and the lower temperature threshold, and the fluid path to the heat exchanger 132 is open when the temperature of the hydraulic fluid 202 is below the lower temperature threshold and the heat exchanger 132 is configured to warm the hydraulic fluid 202.

The portion of the hydraulic system 200 illustrated in FIG. 2 can be described in terms of four loops or fluid paths each beginning with the reservoir 112 and ending with the reservoir 112. A first fluid path, referred to herein as a case drain return fluid path 240, begins at the reservoir 112 and includes the hydraulic line 204, the pump 114, the line 206, the heat exchanger bypass valve 130, and the line 208. A second fluid path, referred to herein as a heat exchange fluid path 242, begins at the reservoir 112 and includes the hydraulic line 204, the pump 114, the line 206, the heat exchanger bypass valve 130, the line 210, the heat exchanger 132, and the line 212. A third fluid path, referred to herein as a return fluid path 244, begins at the reservoir 112 and includes the hydraulic line 204, the pump 114, the pressure line 116, the auxiliary leakage valve 126, a flow restrictor 214, and the return line 118. A fourth fluid path, referred to herein as a use fluid path 246, begins at the reservoir 112 and includes the hydraulic line 204, the pump 114, the pressure line 116, the auxiliary leakage valve 126, the actuator 122, and the return line 118.

The case drain return fluid path 240, among other things, enables heating the hydraulic fluid 202. That is, pumping the hydraulic fluid 202 from the reservoir 112 around the case drain return fluid path 240 increases the temperature of the hydraulic fluid 202. The heat exchange fluid path 242 enables cooling of the hydraulic fluid 202, heating of the hydraulic fluid 202, or both (under different circumstances). For example, in some implementations, the heat exchanger 132 is a simple radiator, in which case the heat exchanger 132 is only configured to cool the hydraulic fluid 202. In other implementations, the heat exchanger 132 is coupled to a temperature control system (not shown) that is configured to supply cooling fluid to the heat exchanger 132 to cool the hydraulic fluid 202, and is configured to supply warming fluid to the heat exchanger 132 to warm the hydraulic fluid 202. In such implementations, the heat exchange fluid path 242 selectively cools or warms the hydraulic fluid 202 depending on the relative temperatures of the hydraulic fluid 202 and the fluid provided by the temperature control system. The bypass return fluid path 244 enables distribution of warm hydraulic fluid 202 to locations near actuators of the hydraulic system 200, and the use fluid path 246 enables use of the actuator 122 (e.g., provides pressurized hydraulic fluid 202 to the actuator 122 for on-demand use by the actuator 122).

FIG. 2 also shows the controller 260 coupled to the auxiliary leakage valve 126 and to one or more sensors, such as a hydraulic fluid sensor 220, a fuel temperature sensor 224, and an ambient temperature sensor 228. Although three sensors are illustrated in FIG. 2, the controller 260 can be coupled to more than three sensor or fewer than three sensors. In addition, the controller 260 can be coupled to other components of a system in which the hydraulic system is integrated. For example, if the hydraulic system 200 is integrated into an aircraft, such as the aircraft 100 of FIG. 1, the controller 260 can also be coupled to a flight computer or another line replaceable unit that receives pilot input or ground crew input.

The controller 260 is configured to, among other things, control operations related to a hydraulic fluid warming operation. In a particular example, the controller 260 is configured to generate control signals to control the auxiliary leakage valve 126 in order to selectively enable the return fluid path 244 in parallel with the use fluid path 246 (e.g., a portion of the hydraulic fluid 202 bypassing the actuator 122 and a portion being provided to the actuator 122). For example, the controller 260 is configured to receive data from the one or more sensors, and to provide a control signal 250 to the auxiliary leakage valve 126, to the actuator 122, or both, based on the received data. If the control signal 250 is sent to the auxiliary leakage valve 126, the auxiliary leakage valve 126 changes position in response to the control signal 250. If the control signal 250 is sent to the actuator 122, the actuator 122 cycles to increase hydraulic fluid flow.

In the example illustrated in FIG. 2, the controller 260 includes a processor 262 and a memory 264. The memory 264 stores control data 268 and instructions 266 that are executable by the processor 262. The control data 268 includes information that is used to determine the control signal 250 based on data from the one or more sensors. In some implementations, the controller 260 is also configured to control (directly or indirectly) the pump 114, the heat exchanger bypass valve 130, the actuator 122, or other portions of the hydraulic system 200. For example, the controller 260 can be configured to initiate or perform an automatic hydraulic fluid warming procedure by providing a control signal (not shown) to start the pump 114 to warm the hydraulic fluid 202 (e.g., via circulation through the case drain return fluid path 240, the heat exchange fluid path 242, or both). In this example, the automatic hydraulic fluid warming procedure also includes, concurrently with starting the pump 114 or after starting the pump 114 (e.g., when the temperature of the hydraulic fluid 202 satisfies a temperature condition), sending the control signal 250 to open the return fluid path 244. In another example, the controller 260 can initiate or perform the automatic hydraulic fluid warming procedure by sending the control signal 250 to open the return fluid path 244 after determining that the pump 114 is active (e.g., is warming the hydraulic fluid 202). In some implementations, the controller 260 controls the pump 114 indirectly by signaling another controller (not shown) to request that the other controller start the pump 114.

In the example illustrated in FIG. 2, the control data 268 indicates a condition (or several conditions) under which the controller 260 causes the auxiliary leakage valve 126 to open the return fluid path 244, a condition (or several conditions) under which the controller 260 causes the auxiliary leakage valve 126 to close the return fluid path 244, or both.

In a particular implementation, the use fluid path 246 is always open, and the return fluid path 244 is normally closed. In this particular implementation, the controller 260 generates the control signal 250 to cause the auxiliary leakage valve 126 to open the return fluid path 244 in response to detecting a condition indicating that the hydraulic fluid 202 should be warmed. The control data 268 includes control rules or thresholds used to determine whether a value indicated by data from the one or more sensors indicates that the hydraulic fluid 202 should be warmed. A condition indicating that the hydraulic fluid 202 should be warmed can be indicated by ambient temperature data 230 from the ambient temperature sensor 228, by fuel temperature data 226 from the fuel temperature sensor 224, by hydraulic fluid data 222 from the hydraulic fluid sensor 220, or by a combination thereof. For example, the control data 268 can include a look-up table or another data structure indicating one or more temperature thresholds, which, if satisfied, indicate that the hydraulic fluid 202 should be warmed. In this example, each temperature threshold corresponds to a temperature related to or indicative of the temperature of the hydraulic fluid 202. For example, a first temperature threshold can indicate a hydraulic fluid lower temperature threshold. Additionally, or in the alternative, a second temperature threshold can indicate an ambient lower temperature threshold. Additionally, or in the alternative, a third temperature threshold can indicate a fuel lower temperature threshold.

For example, the control data 268 can include an ambient temperature threshold. In this example, if the ambient temperature indicated by a temperature value of the ambient temperature data 230 satisfies (e.g., is less than or equal to) the ambient temperature threshold, the controller 260 determines that hydraulic fluid warming operations should be initiated. Alternatively, in this example, the controller 260 determines that hydraulic fluid warming operations should be initiated if the ambient temperature satisfies the ambient temperature threshold and if one or more other conditions are satisfied, such as if the aircraft is on the ground rather than in flight.

As another example, the control data 268 can include a fuel temperature threshold. In this example, if the fuel temperature indicated by a temperature value of the fuel temperature data 226 satisfies (e.g., is less than or equal to) the fuel temperature threshold, the controller 260 determines that hydraulic fluid warming operations should be initiated. Alternatively, in this example, the controller 260 determines that hydraulic fluid warming operations should be initiated if the fuel temperature satisfies the fuel temperature threshold and if one or more other conditions are satisfied, such as if the aircraft is on the ground rather than in flight.

As yet another example, the control data 268 can include a hydraulic fluid temperature threshold. In this example, the hydraulic fluid data 222 can include hydraulic fluid temperature data, and if a temperature value of the hydraulic fluid data 222 satisfies (e.g., is less than or equal to) the hydraulic fluid temperature threshold, the controller 260 determines that hydraulic fluid warming operations should be initiated. Alternatively, in this example, the controller 260 determines that hydraulic fluid warming operations should be initiated if the hydraulic fluid temperature satisfies the hydraulic fluid temperature threshold and if one or more other conditions are satisfied, such as if the aircraft is on the ground rather than airborne, if hydraulic fluid pressure (indicated by the hydraulic fluid data 222) indicates that the pump 114 is active, etc.

According to one implementation, the controller 260 generates the control signal 250 based on a crew input, such as a switch position. For example, aircrew or ground crew of an aircraft can initiate warming operations (e.g., circulation of the hydraulic fluid 202 through the return fluid path 244) by moving a hydraulic fluid warming switch to an ON position. As another example, the aircrew or ground crew of the aircraft can enable the controller 260 to determine whether to initiate the warming operations (e.g., circulation of the hydraulic fluid 202 through the return fluid path 244) by moving the hydraulic fluid warming switch to an AUTO position. As yet another example, the aircrew or ground crew of the aircraft can disable the warming operations by moving the hydraulic fluid warming switch to an OFF position.

Figure 3:
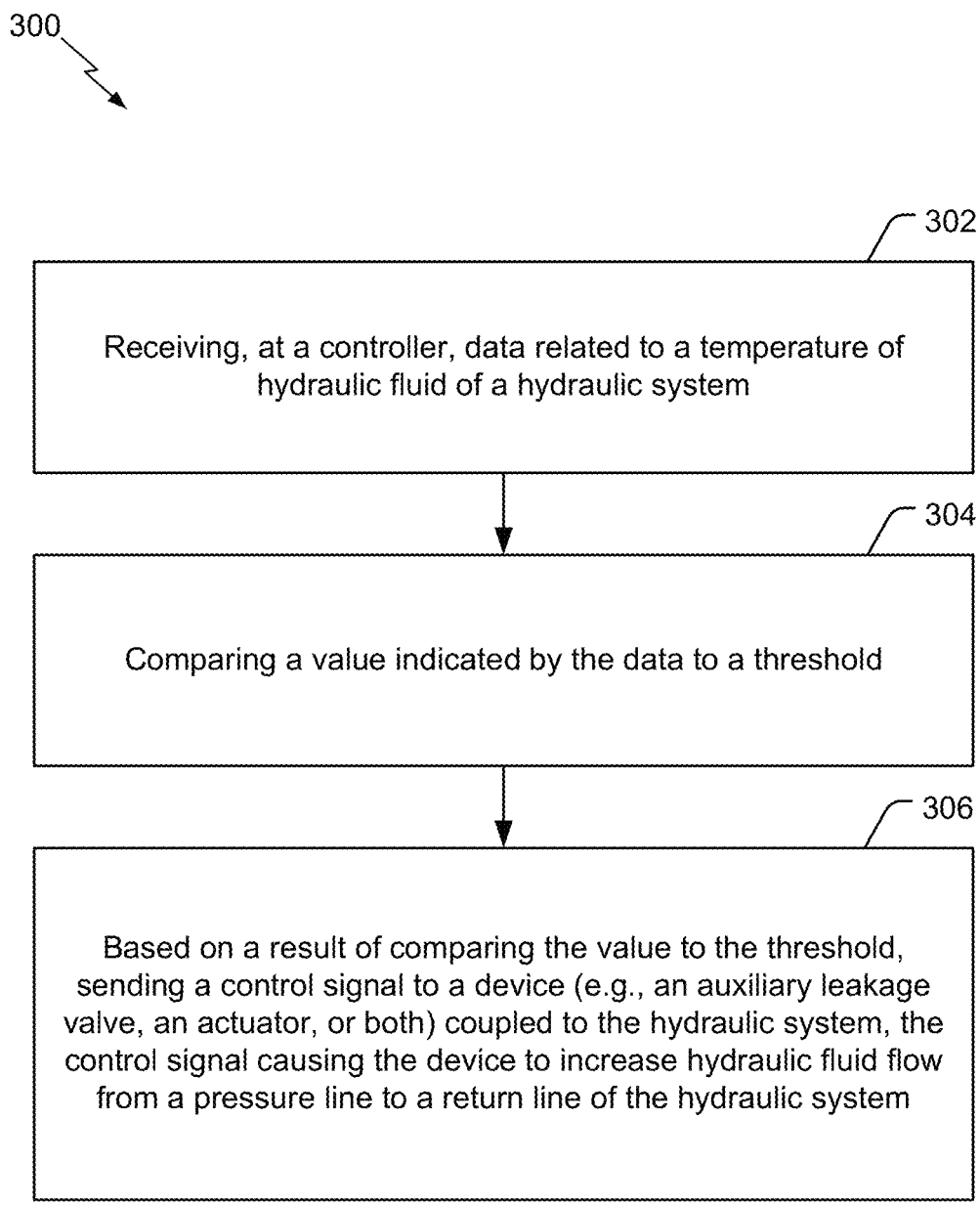
FIG. 3 is a flowchart of a method of warming hydraulic fluid of the hydraulic system of FIGS. 1 and 2.

Referring to FIG. 3, a flowchart of a method 300 for warming hydraulic fluid 202 of the hydraulic system of FIGS. 1 and 2 is shown. The method 300 may be performed by the aircraft 100 of FIG. 1, the hydraulic system 200 of FIG. 2, or both.

The method 300 includes receiving, at a controller, data related to a temperature of hydraulic fluid of a hydraulic system, at 302. For example, referring to FIG. 2, the controller 260 receives data from one or more sensors, such as the ambient temperature data 230 from the ambient temperature sensor 228, the fuel temperature data 226 from the fuel temperature sensor 224, the hydraulic fluid data 222 from the hydraulic fluid sensor 220, or a combination thereof. At least some of the data received by the controller 260 is indicative of the temperature of the hydraulic fluid 202. For example, the hydraulic fluid data 222 may directly indicate a value of the hydraulic fluid temperature. As another example, the fuel temperature data 226 indicates the temperature of the fuel in the fuel tank 110, and if the hydraulic fluid 202 is routed through lines in the fuel tank 110, is indicative of the temperature of the hydraulic fluid 202 if the hydraulic fluid 202 is not otherwise heated. Stated another way, if the hydraulic system 200 is off (e.g., the pump 114 is not active), the hydraulic fluid 202 in lines in the fuel tank 110 will eventual equalize to approximately the temperature of the fuel in the fuel tank 110. As yet another example, even if the hydraulic fluid 202 is not routed through lines in the fuel tank 110, the ambient temperature is, as a first approximation, indicative of the temperature of the hydraulic fluid 202 if the hydraulic fluid 202 is not otherwise heated. Stated another way, if the hydraulic system 200 is off (e.g., the pump 114 is not active) long enough, the hydraulic fluid 202 in lines and in the reservoir 112 will eventually equalize to approximately the ambient temperature.

The method 300 also includes comparing a value indicated by the data to a threshold, at 304. For example, the threshold can be accessed from the control data 268 in the memory 264 of FIG. 2. In this example, a value indicated by the data from the one or more sensors is compared to a corresponding threshold for initiating hydraulic fluid warming operations. Although the controller 260 is described in FIG. 2 in terms of data and processing, which may imply digital processes, in some implementations, the controller 260 can be analog or partially analog. To illustrate, one or more of the sensors 228, 224, 220 can provide an analog value indicative of temperature, such as a voltage with a magnitude that indicates a particular temperature value. In this example, comparing a value of the temperature data to the threshold can include, for example, comparing the magnitude of the voltage from the sensor to a reference voltage.

The method 300 further includes, based on a result of comparing the value to the threshold, sending a control signal to a device coupled to the hydraulic system, at 306. The control signal causes the device to increase hydraulic fluid flow from a pressure line to a return line of the hydraulic system in order to warm the hydraulic fluid and distribute warm hydraulic fluid in the hydraulic system. For example, the result of comparing the value to the threshold may indicate that the hydraulic fluid temperature, indicated by the hydraulic fluid data 222, satisfies (e.g., is less than or is less than or equal to) the hydraulic fluid lower temperature threshold, the controller 260 generates and sends the control signal 250 to the auxiliary leakage valve 126, to the actuator 122, or to both. The controller 260 can also consider other factors before sending the control signal 250, such as an operational state of the hydraulic system 200 (e.g., whether the pump 114 is active), an operational state of a system in which the hydraulic system 200 is integrated (e.g., is the aircraft 100 of FIG. 1 airborne), other factors, or a combination thereof.

As a specific example, in some implementations, the device that receives the control signal 250 includes the auxiliary leakage valve 126. In such implementations, the control signal 250 causes the auxiliary leakage valve 126 to open the fluid path 244 (e.g., a restricted fluid path) to allow a restricted amount of the hydraulic fluid 202 to flow from the pressure line 116 to the return line 118. As another specific example, in some implementations, the device that receives the control signal 250 includes the actuator 122. In such implementations, the control signal 250 causes the actuator 122 to cycle (e.g., change positions very slightly, such as less than 10% of its full range of motion) to increase the hydraulic fluid flow from the pressure line to the return line. In yet other examples, the control signal 250 causes the auxiliary leakage valve 126 to open the fluid path 244 and causes the actuator 122 to cycle.

Figure 4:
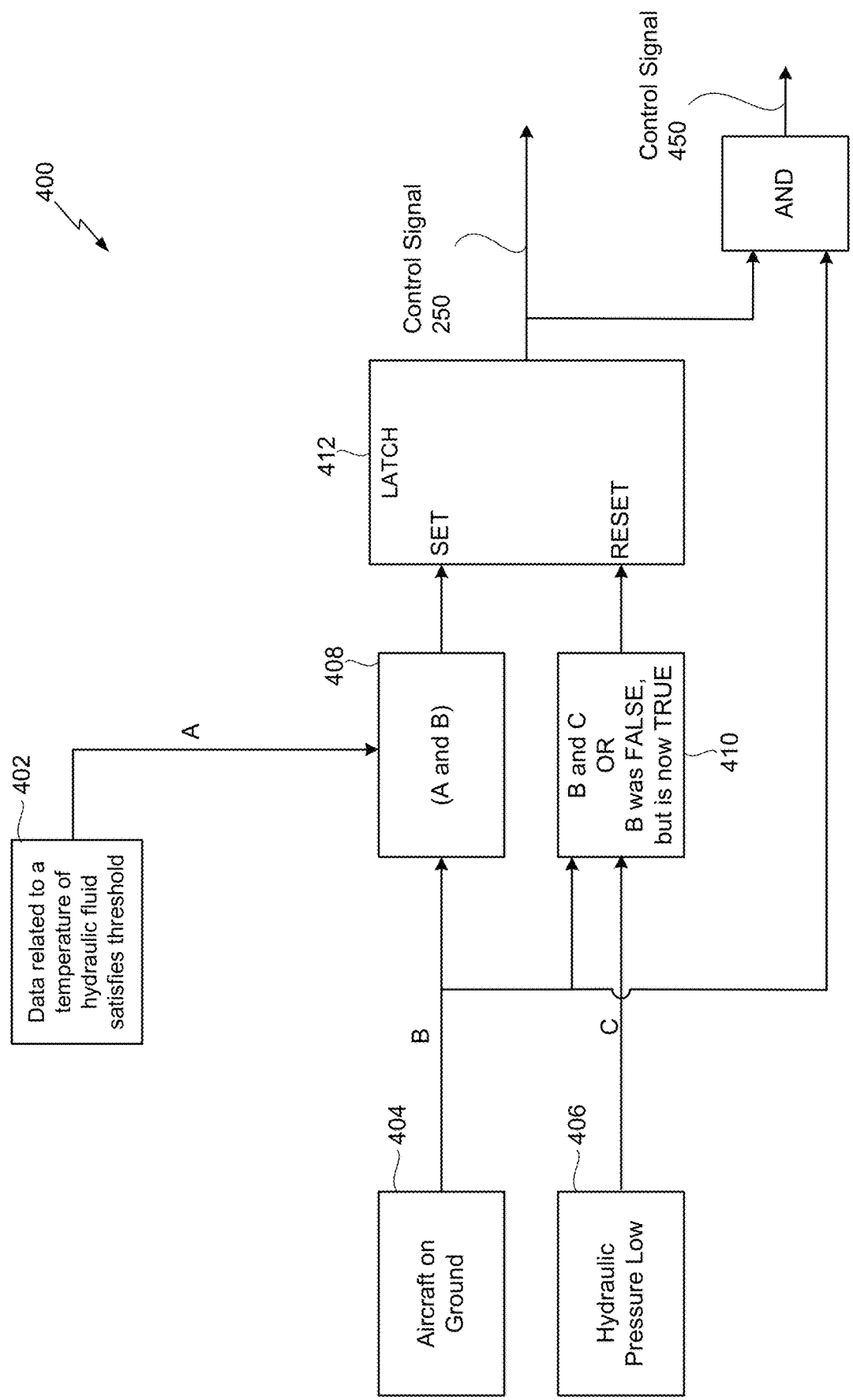
FIG. 4 is a process diagram for generating a control signal for the bypass valve of FIG. 1.

FIG. 4 shows a diagram 400 illustrating decision logic for generating the control signal 250. The operations illustrated in the diagram 400 can be performed by the controller 260 of FIG. 2. The diagram 400 illustrates three logical (e.g., Boolean) inputs. The logical inputs include a first input 402 that has a value A if data related to a temperature of the hydraulic fluid 202 satisfies a threshold. Conversely, the first input 402 has a value −A (or "not A") if data related to a temperature of the hydraulic fluid 202 does not satisfy the threshold. A second input 404 that has a value B if the aircraft 100 is airborne and has a value −B (or "not B") if the aircraft 100 is not airborne. A third input 406 indicates whether the hydraulic system 200 is active, whether the pump 114 is active, or both. In the example illustrated in FIG. 4, the third input 406 has a value that is based on the pressure of the hydraulic system 200. In this example, the third input 406 has a value C if hydraulic pressure in the hydraulic system 200 is below a pressure threshold (i.e., is "low") and has a value −C (or "not C") if the pressure in the hydraulic system 200 is not below a pressure threshold (i.e., greater than or equal to the pressure threshold).

In the example illustrated in FIG. 4, the control signal 250 is reset, at 410, if B and C are true (indicating that the aircraft 100 is on the ground and the hydraulic pressure is low). The control signal 250 is also reset, at 410, if B was false (e.g., during an immediately preceding sampling period) and is now true (indicating that the aircraft 100 recently landed). In terms of the hydraulic system 200 of FIG. 2, resetting the control signal 250 results in the auxiliary leakage valve 126 closing the return fluid path 244.

In the example illustrated in FIG. 4, the control signal 250 is set, at 408, if A and B are true (indicating that the aircraft 100 is on the ground and the data related to the temperature of hydraulic fluid 202 satisfies (e.g., less than or equal to) the threshold), and the RESET conditions, at 410, are not satisfied. The latch 412 is a reset-precedent latch (e.g., if both the RESET and SET conditions are satisfied, then the latch 412 is reset and the control signal 250 will be set logical FALSE). In terms of the hydraulic system 200 of FIG. 2, setting the control signal 250 results in the auxiliary leakage valve 126 opening the return fluid path 244. Setting the control signal 250 may also result in the controller 260 causing the pump 114 to be activated to heat the hydraulic fluid 202 via circulation through the case drain return fluid path 240, the heat exchange fluid path 242, or both. Setting the control signal 250 may also result in the controller 260 causing the control surface 108 to cycle in the manner described above. In other implementations, a control signal 450 is used to control the cycling of the control surface 108 so as to avoid reduced ride quality, decreased controllability of the aircraft, or other deleterious effects a moving pair of surfaces in flight would present. The control signal 450 is generated if B is true (indicating that the aircraft 100 is on the ground) and the latch 412 is set. In some implementations, the control signal 450 can be sent to control operation of the auxiliary leakage valve 126 or cycling a control surface over a small fraction of its operational range whether the aircraft is in flight or on the ground.

Figure 5:
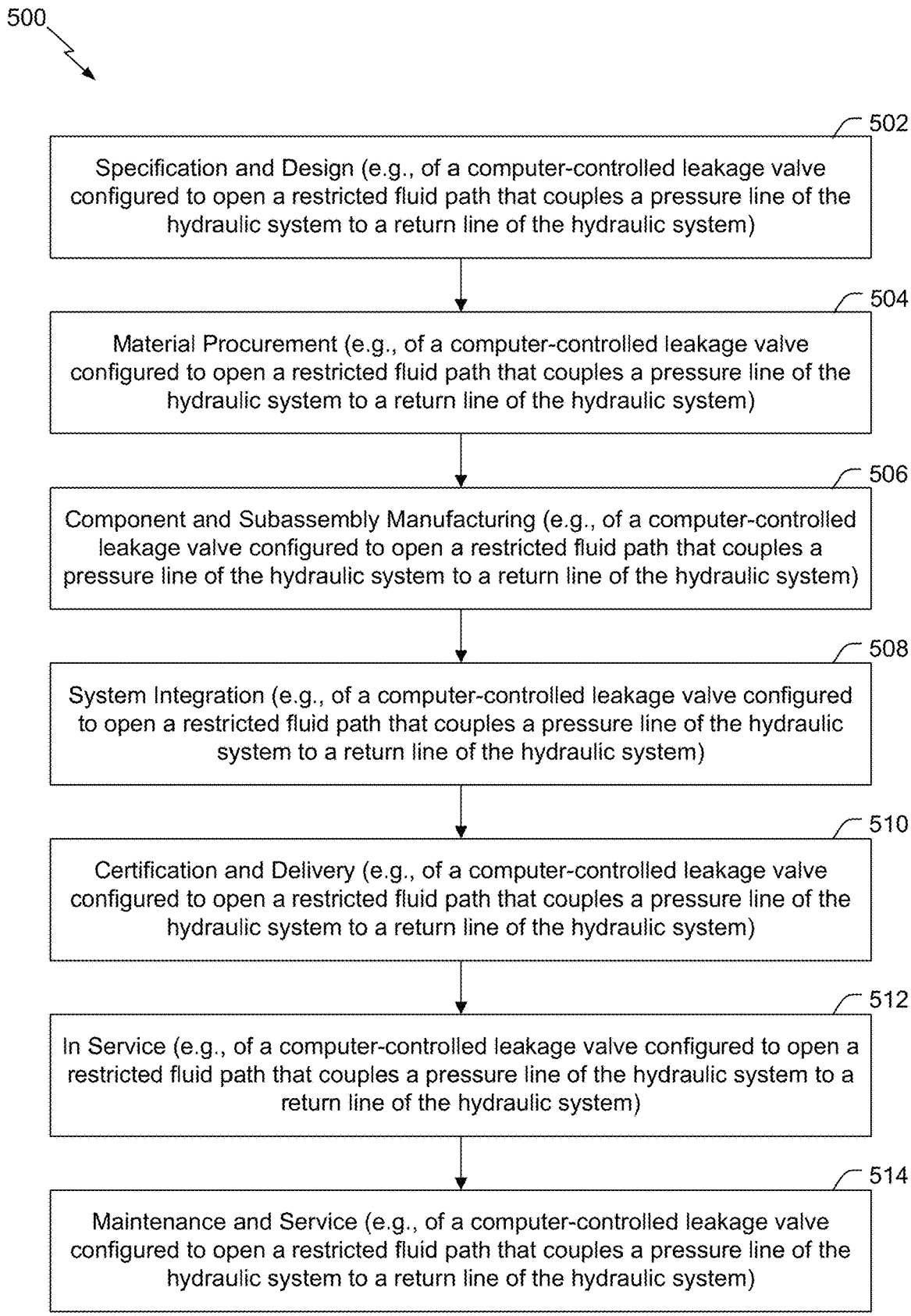
FIG. 5 is a flow chart of a method associated with a hydraulic system.
Figure 6:
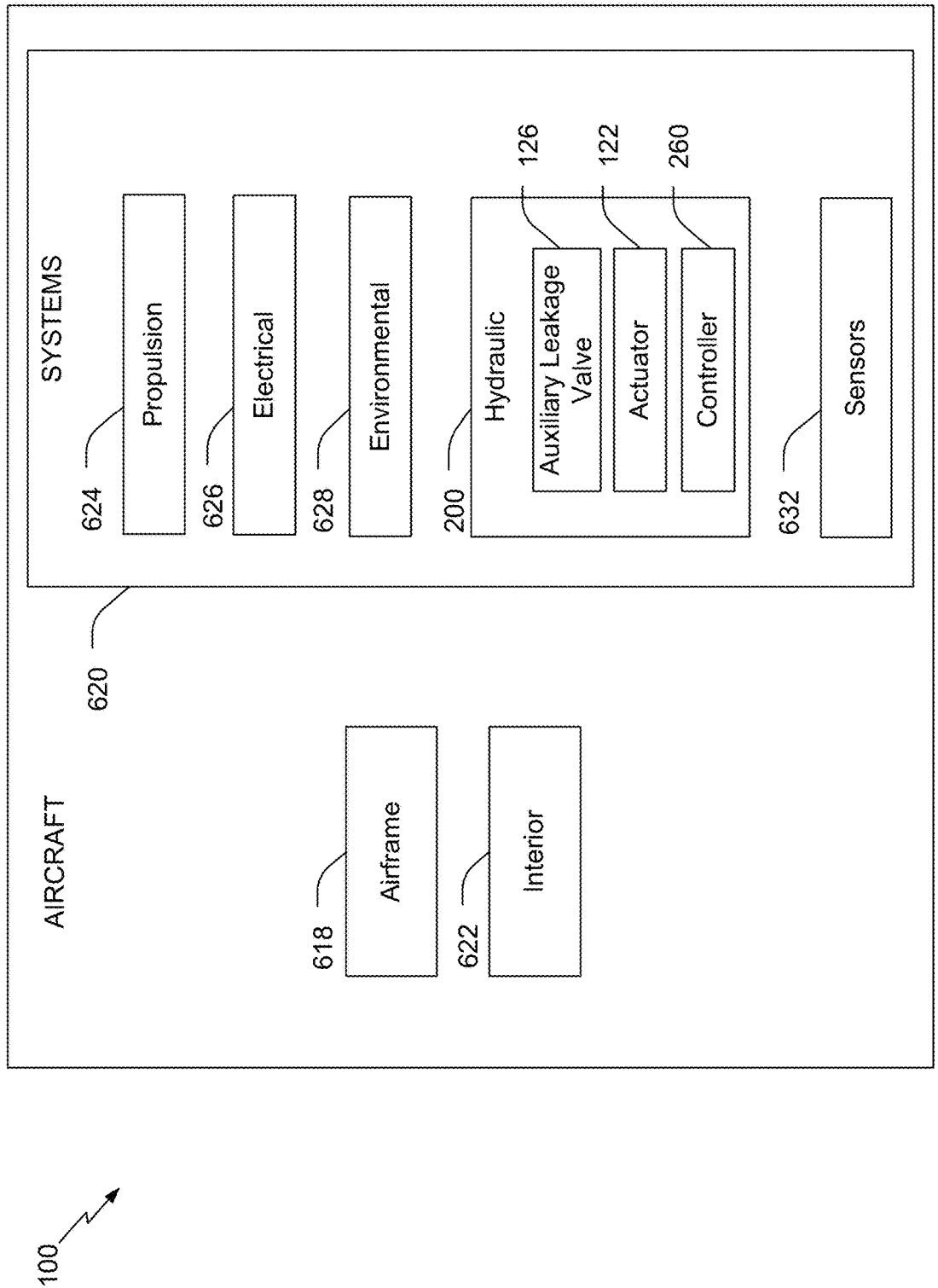
FIG. 6 is a block diagram of an aircraft including a hydraulic system.

Referring to FIGS. 5 and 6, examples of the disclosure are described in the context of an aircraft design, manufacturing, and service. FIG. 5 shows a flowchart illustrative of a method 500 associated with an aircraft hydraulic system (e.g., the hydraulic system 200). During pre-production, the method 500 includes, at 502, specification and design of an aircraft, such as the aircraft 100. During the specification and design of the aircraft, the method 500 includes specifying a computer-controlled leakage valve (e.g., the auxiliary leakage valve 126) configured to open a restricted fluid path that couples a pressure line of the hydraulic system to a return line of the hydraulic system via a flow restrictor. At 504, the method 500 includes material procurement. For example, the method 500 includes procuring materials (such as materials for the computer-controlled leakage valve) for the aircraft hydraulic system.

During production, the method 500 includes, at 506, component and subassembly manufacturing and, at 508, system integration of the aircraft. The method 500 may include component and subassembly manufacturing of the computer-controlled leakage valve and system integration of the computer-controlled leakage valve within the aircraft hydraulic system. At 510, the method 500 includes certification and delivery of the aircraft and, at 512, placing the aircraft in service. In some implementations, certification and delivery includes certifying the computer-controlled leakage valve. Placing the aircraft in service may also include placing the computer-controlled leakage valve in service. While in service, the aircraft may be scheduled for routine maintenance and service (which may also include modification, reconfiguration, refurbishment, and so on). At 514, the method 500 includes performing maintenance and service on the aircraft. The method 500 may include performing maintenance and service on the computer-controlled leakage valve. For example, maintenance and service of the hydraulic system of the aircraft 100 can include replacing the hydraulic system 200, the controller 260, the auxiliary leakage valve 126, or a combination thereof.

FIG. 6 is a block diagram of an illustrative implementation of the aircraft 100 that includes components of the hydraulic system 200. In at least one implementation, the aircraft 100 is produced by at least a portion of the method 500 of FIG. 5. As shown in FIG. 6, the aircraft 100 includes an airframe 618, a plurality of systems 620, and an interior 622. Examples of the plurality of systems 620 include one or more of a propulsion system 624, an electrical system 626, an environmental system 628, the hydraulic system 200, and a sensor system 632. The sensor system 632 includes one or more sensors onboard the aircraft 100 and configured to generate sensor data during operation of the aircraft 100. The hydraulic system 200 includes at least the auxiliary leakage valve 126, the actuator 122, and the controller 260. Any number of other systems may be included in the aircraft 100. Although an aerospace example is shown, the present disclosure may be applied to other industries. For example, the hydraulic system 200 can be used onboard another manned or unmanned vehicle (such as a satellite, a watercraft, or a land-based vehicle).

Apparatus and methods included herein may be employed during any one or more of the stages of the method 500 of FIG. 5. For example, components or subassemblies corresponding to production process 508 can be fabricated or manufactured in a manner similar to components or subassemblies produced while the aircraft 100 is in service, at 512 for example and without limitation. Also, one or more apparatus implementations, method implementations, or a combination thereof may be utilized during the production stages (e.g., stages 502-510 of the method 500), for example, by substantially expediting assembly of or reducing the cost of the aircraft 100. Similarly, one or more of apparatus implementations, method implementations, or a combination thereof may be utilized while the aircraft 100 is in service, for example and without limitation, to maintenance and service, at 514.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. An aircraft comprising:
   a hydraulic system including hydraulic fluid, a pressure line, and a return line;
   a sensor configured to generate data related to a temperature of the hydraulic fluid of the hydraulic system;
   an actuator coupled to the hydraulic system;
   an auxiliary leakage valve coupled to the actuator, to the pressure line, and to the return line, the auxiliary leakage valve configured to selectively open a restricted fluid path, wherein the restricted fluid path couples the pressure line to the return line to allow a restricted amount of the hydraulic fluid to flow from the pressure line to the return line; and
   a controller coupled to the auxiliary leakage valve and configured to, based on data indicating that the aircraft is not airborne and based on a comparison of a temperature value indicated by the data to a threshold, send a control signal to the auxiliary leakage valve, to the actuator, or both, to cause an increase in hydraulic fluid flow from the pressure line to the return line.

2. The aircraft of claim 1, wherein the hydraulic system further comprises:
   a reservoir to store the hydraulic fluid; and
   a pump configured to pressurize a portion of the hydraulic fluid provided to the pressure line.

3. The aircraft of claim 2, wherein the controller is further configured to activate the pump based on a determination that the temperature value indicated by the data is less than the threshold.

4. The aircraft of claim 2, wherein the controller is further configured to determine whether the pump is activated before sending the control signal.

5. The aircraft of claim 4, wherein the controller determines whether the pump is activated based on a pressure of the hydraulic fluid.

6. The aircraft of claim 1, further comprising a second actuator coupled to the hydraulic system, wherein the controller is further configured to cycle the second actuator based on a determination that the temperature value indicated by the data is less than the threshold.

7. The aircraft of claim 1, wherein the controller is further configured to, based on a second comparison of the temperature value to a second threshold, send a second control signal to the auxiliary leakage valve to cause the auxiliary leakage valve to close the restricted fluid path.

8. The aircraft of claim 1, further comprising a fuel tank, wherein a portion of the pressure line is routed through the fuel tank.

9. The aircraft of claim 1, wherein the controller is configured to send the control signal further based on a position of a switch.

10. The aircraft of claim 1, wherein the data includes fuel temperature data or ambient temperature data.

11. A method comprising:
    receiving, at a controller, data related to a temperature of hydraulic fluid of a hydraulic system;
    comparing a value indicated by the data to a threshold; and
    based on a determination that an aircraft comprising the hydraulic system is not airborne and based on a result of comparing the value to the threshold, sending a control signal to a device coupled to the hydraulic system, wherein the control signal causes the device to increase hydraulic fluid flow from a pressure line to a return line of the hydraulic system.

12. The method of claim 11, wherein the device includes an auxiliary leakage valve, wherein the control signal causes the auxiliary leakage valve to open a restricted fluid path that couples the pressure line of the hydraulic system to the return line of the hydraulic system, and wherein the restricted fluid path allows a restricted amount of the hydraulic fluid to flow from the pressure line to the return line.

13. The method of claim 11, wherein the device includes an actuator, and wherein the control signal causes the actuator to cycle to increase flow of the hydraulic fluid from the pressure line to the return line.

14. The method of claim 11, wherein the data related to the temperature of the hydraulic fluid of the hydraulic system includes ambient temperature data.

15. The method of claim 11, wherein the data related to the temperature of the hydraulic fluid of the hydraulic system includes fuel temperature data.

16. The method of claim 11, wherein the data related to the temperature of the hydraulic fluid of the hydraulic system includes hydraulic fluid temperature data.

17. The method of claim 11, wherein the hydraulic fluid flows through at least one line in a fuel tank.

18. A hydraulic system of an aircraft comprising:
    a fuel tank;
    a pump;
    a pressure line coupled to the pump and configured to distribute pressurized hydraulic fluid;
    a return line configured to return hydraulic fluid to a reservoir, wherein a portion of the pressure line, a portion of the return line, or both are routed through the fuel tank;
    a controller, wherein the controller receives data related to a temperature of the hydraulic fluid, and wherein the data related to the temperature of the hydraulic fluid includes fuel temperature data from the fuel tank; and an auxiliary leakage valve coupled to the pressure line, to the return line, and to an actuator, the auxiliary leakage valve configured to:
    receive a control signal from the controller, wherein the control signal is based on a comparison of a value indicated by the data to a threshold; and
    based on the control signal, selectively open a restricted fluid path, wherein the restricted fluid path couples the pressure line to the return line to allow a restricted amount of the hydraulic fluid to flow from the pressure line to the return line.

19. The hydraulic system of claim 18, further comprising a sensor. wherein the sensor is configured to provide at least a portion of the data to the controller.

20. The hydraulic system of claim 18, further comprising the actuator, wherein the actuator is configured to receive the control signal from the controller, and wherein the actuator at least partially cycles based on the control signal to allow hydraulic fluid flow through the actuator.

* * * * *